(12) United States Patent
Manivasagam et al.

(10) Patent No.: US 10,829,109 B2
(45) Date of Patent: Nov. 10, 2020

(54) TECHNIQUES FOR MONITORING MECHANISMS TO SECURE VEHICLE AND REMEDIAL ACTION

(71) Applicants:Sathya Manivasagam, Bloomfield Hills, MI (US); Behrouz Ashrafi, Northville, MI (US); Feisel F Weslati, Troy, MI (US)

(72) Inventors: Sathya Manivasagam, Bloomfield Hills, MI (US); Behrouz Ashrafi, Northville, MI (US); Feisel F Weslati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 18 days.

(21) Appl. No.: 16/363,299

(22) Filed: Mar. 25, 2019

(65) Prior Publication Data

US 2019/0299977 A1 Oct. 3, 2019

Related U.S. Application Data

(60) Provisional application No. 62/651,989, filed on Apr. 3, 2018.

(51) Int. Cl.
*B60W 20/50* (2016.01)
*B60W 10/196* (2012.01)
(Continued)

(52) U.S. Cl.
CPC ............ *B60W 20/50* (2013.01); *B60W 10/06* (2013.01); *B60W 10/08* (2013.01); *B60W 10/182* (2013.01); *B60W 10/196* (2013.01); *F16H 63/3425* (2013.01); *F16H 63/3466* (2013.01); *G07C 5/0808* (2013.01); *B60W 2510/188* (2013.01); *B60W 2520/10* (2013.01); *B60W 2540/12* (2013.01); *B60W 2540/16* (2013.01); *B60W 2710/0666* (2013.01); *B60W 2710/083* (2013.01); *B60W 2710/186* (2013.01); *B60W 2710/188* (2013.01); *B60Y 2200/92* (2013.01)

(58) Field of Classification Search
None
See application file for complete search history.

(56) References Cited

U.S. PATENT DOCUMENTS 5,696,679 A 12/1997 Marshall et al.
7,681,961 B2 * 3/2010 Nonaga ................. B60T 13/746
188/162
(Continued)

*Primary Examiner* — Justin Holmes
(74) *Attorney, Agent, or Firm* — Ralph E Smith

(57) ABSTRACT

Systems and methods for controlling a park pawl system of a hybrid vehicle having a hybrid powertrain comprising an engine and a hybrid transmission comprising at least one electric propulsion motor, the systems and methods each utilizing a control system configured to detect, using a main control system portion, a desired park state based on at least an input via a transmission gear selector and an input via a brake pedal and detect, using a distinct monitoring system portion, whether the desired park state is valid based on at least the transmission gear selector and brake pedal inputs. When the desired park state is valid, the control system commands the park pawl system to the desired park state. When the desired park state is invalid, however, the control system commands an electric park brake of the vehicle to prevent movement at a driveline of the vehicle.

16 Claims, 3 Drawing Sheets

(51) Int. Cl.
    *B60W 10/18*     (2012.01)
    *G07C 5/08*     (2006.01)
    *F16H 63/34*     (2006.01)
    *B60W 10/06*     (2006.01)
    *B60W 10/08*     (2006.01)

(56) References Cited

U.S. PATENT DOCUMENTS

| | | | |
|---|---|---|---|
| 2007/0284213 A1 | 12/2007 | Duhaime et al. | |
| 2008/0217123 A1* | 9/2008 | Fujita | F16H 63/3416 188/161 |
| 2013/0268171 A1* | 10/2013 | Huls | B60T 13/741 701/70 |
| 2015/0025750 A1 | 1/2015 | Weslati et al. | |
| 2015/0291135 A1* | 10/2015 | Vernacchia | B60T 7/122 701/70 |
| 2015/0344004 A1 | 12/2015 | Al-Regib et al. | |
| 2018/0043895 A1* | 2/2018 | Shami | B60T 8/17555 |
| 2018/0128371 A1* | 5/2018 | Ulrey | F16H 63/483 |

\* cited by examiner

TECHNIQUES FOR MONITORING MECHANISMS TO SECURE VEHICLE AND REMEDIAL ACTION

CROSS-REFERENCE TO RELATED APPLICATION

This application claims the benefit of U.S. Provisional Application No. 62/651,989, filed on Apr. 3, 2018. The disclosure of the above application is incorporated herein by reference in its entirety.

FIELD

The present application generally relates to vehicle park pawl control and, more particularly, to systems and methods for monitoring vehicle park pawl control and for taking remedial action when needed.

BACKGROUND

A vehicle typically includes a gear selector, such as a shift lever or rotary knob, that is controlled by a driver of the vehicle to select a gear for a transmission of the vehicle (e.g., park, neutral, drive, reverse, low, or PNDRL). When park is selected by the driver via the gear selector, a park pawl is mechanically actuated or electronically actuated ("by wire") via a command provided to an actuation mechanism such as electric motor to engage/disengage the park gear of the transmission. For electronic park pawl control, the displacement of the actuation mechanism is measured by a sensor, which is then utilized as feedback in controlling the actuation mechanism and the park pawl. When the park pawl system malfunctions or when the desired state of the park pawl system is incorrectly determined and commanded, the transmission could be unintentionally transitioned out of park, which could potentially be an undesirable operating scenario. Accordingly, while such park pawl control and monitoring systems and methods do work well for their intended purpose, there remains a need for improvement in the relevant art.

SUMMARY

According to one example aspect of the invention, a system for a hybrid vehicle is presented. In one exemplary implementation, the system comprises: a park pawl system comprising an electric motor and a park pawl, wherein the electric motor is configured to actuate the park pawl to engage and disengage a park gear of the vehicle to prevent movement at a driveline of the vehicle and a control system configured to: control a hybrid powertrain of the vehicle, the powertrain comprising an engine and a hybrid transmission comprising at least one electric propulsion motor, detect, using a main control system portion of the control system, a desired park state based on at least an input via a transmission gear selector and an input via a brake pedal, detect, using a monitoring system portion of the control system that is distinct from the main control system portion, whether the desired park state is valid based on at least the transmission gear selector and brake pedal inputs, when the desired park state is valid, command the park pawl system to the desired park state, and when the desired park state is invalid, command an electric park brake (EPB) of the vehicle to prevent movement at the driveline of the vehicle.

In some implementations, when vehicle movement occurs after the electric motor of the park pawl system is in a park position, the control system is further configured to disable the hybrid powertrain. In some implementations, the control system is configured to disable the hybrid powertrain by setting all torque requests to zero. In some implementations, when vehicle movement occurs after the electric motor of the park pawl system is in the park position, the control system is further configured to set a diagnostic trouble code (DTC).

In some implementations, the main control system and monitoring system portions of the control system are distinct portions of a single processor. In some implementations, the main control system and monitoring system portions of the control system are separate cores of the single processor. In some implementations, the main control system and monitoring system portions of the control system are two distinct processors.

In some implementations, the main control system and monitoring system portions of the control system are configured to detect the desired park state and whether it is valid based further on a speed of the vehicle and a position of the electric motor of the park pawl system. In some implementations, the transmission comprises two electric propulsion motors.

According to another example aspect of the invention, a hybrid vehicle is presented. In one exemplary implementation, the vehicle comprises: a hybrid powertrain comprising an engine, a hybrid transmission comprising at least one electric propulsion motor, and a driveline, wherein the engine and the hybrid transmission collectively or independently provide a drive torque to the driveline, a park pawl system comprising an electric motor and a park pawl, wherein the electric motor is configured to actuate the park pawl to engage and disengage a park gear of the vehicle to prevent movement at the driveline, and a control system configured to: control the hybrid powertrain, detect, using a main control system portion of the control system, a desired park state based on at least an input via a transmission gear selector and an input via a brake pedal, detect, using a monitoring system portion of the control system that is distinct from the main control system portion, whether the desired park state is valid based on at least the transmission gear selector and brake pedal inputs, when the desired park state is valid, command the park pawl system to the desired park state, and when the desired park state is invalid, command an EPB of the vehicle to prevent movement at the driveline of the vehicle.

In some implementations, when vehicle movement occurs after the electric motor of the park pawl system is in a park position, the control system is further configured to disable the hybrid powertrain. In some implementations, the control system is configured to disable the hybrid powertrain by setting all torque requests to zero. In some implementations, when vehicle movement occurs after the electric motor of the park pawl system is in the park position, the control system is further configured to set a DTC.

In some implementations, the main control system and monitoring system portions of the control system are distinct portions of a single processor. In some implementations, the main control system and monitoring system portions of the control system are separate cores of the single processor. In some implementations, the main control system and monitoring system portions of the control system are two distinct processors.

In some implementations, the main control system and monitoring system portions of the control system are configured to detect the desired park state and whether it is valid based further on a speed of the vehicle and a position of the electric motor of the park pawl system. In some implementations, the transmission comprises two electric propulsion motors.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for improvement for electronically-controlled vehicle park pawl systems, particularly in hybrid vehicles having hybrid transmissions with one or more electric propulsion motors. There are many causes of inadvertent park gear disengagement or unfulfilled park gear engagement (e.g., after request by the driver), such as, but not limited to, computation error and memory corruption. A main control system determines a desired park state (e.g., P, or one of RNDL) and controls a park pawl system accordingly. A distinct and redundant monitoring system performs the same functionality as the main control system, but is located in a separate portion of the same processor (e.g., a separate core) or in a separate processor altogether. When these values differ, a malfunction is detected. An electric park brake (EPB) is initially actuated to prevent motion at a driveline of the vehicle. If vehicle movement were to still occur, however, the hybrid powertrain could be disabled (e.g., by setting all torque requests to zero) and a diagnostic trouble code (DTC) could be set. The benefits of these techniques include improved vehicle safety by preventing the vehicle from inadvertently moving.

Figure 1:
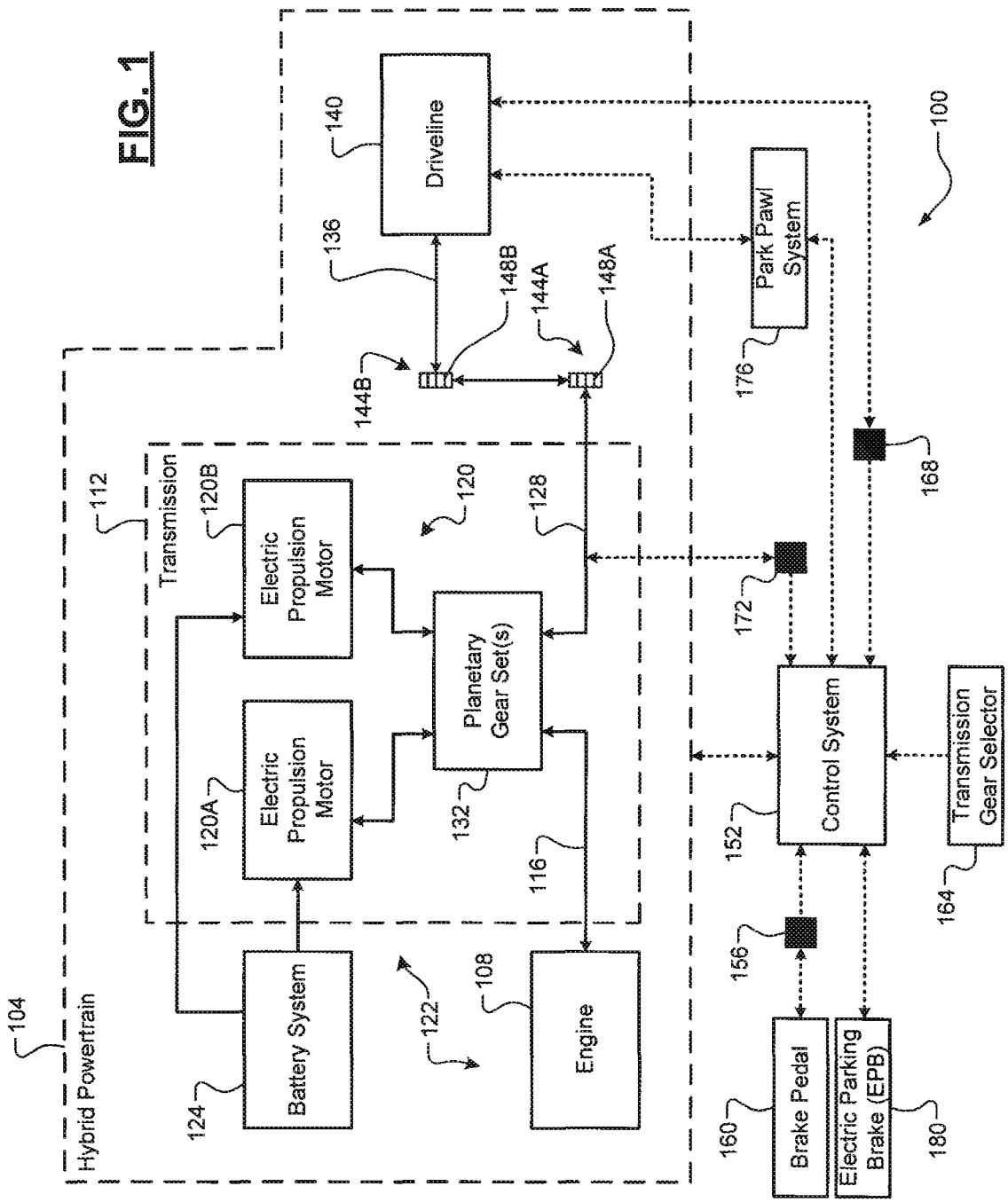
FIG. 1 is a functional block diagram of an example hybrid vehicle according to the principles of the present disclosure.

Referring now to FIG. 1, a functional block diagram of an example hybrid vehicle 100 is illustrated. Non-limiting examples of the vehicle include a battery electric vehicle (BEV) and a plug-in hybrid electric vehicle (PHEV). The vehicle 100 includes a hybrid powertrain 104 comprising an engine 108 and a hybrid transmission 112. The engine 108 is configured to combust an air/fuel mixture within cylinders to generate drive torque at a crankshaft 116, which is coupled to one of a plurality of planetary gear sets 132 of the transmission 112. In one exemplary implementation, the transmission 112 comprises two electric propulsion motors 120A and 120B (collectively, "electric propulsion motors 120" or "electric motors 120") that are each powered by a battery system 124 and configured to generate torque that is transmitted to an output shaft 128 of the transmission 112 ("transmission output shaft 128") via one or more of the planetary gear sets 132. The engine 108 and the electric motors 120 are also referred to collectively herein as "torque generating system 122." As described herein and shown in FIG. 1, the transmission 112 could also be referred to as a continuously variable transmission (CVT) or an electrically variable transmission (EVT).

In one exemplary implementation, the crankshaft 116 is coupled to a first planetary gear set 132, which is in turn connected to one of the electric motors 120. In this exemplary implementation, the other electric motor 120 is connected to one or more other planetary gear sets 132, and one or more of the planetary gear sets 132 is coupled to the transmission output shaft 128. While two electric motors 120 are illustrated herein, it will be appreciated that the vehicle 100 could include any combination of one or more electric motors that are configured to generate propulsive torque. Because the electric motors 120 are configured to generate drive torque at the transmission output shaft 128, the engine 108 could be configured to have a lower cylinder compression ratio, thereby increasing fuel economy. That is, the electric motors 120 are able to compensate for the decreased power density of (and thus a lack of drive torque produced by) such a lower-compression engine, particularly at low loads/speeds. In one exemplary implementation, the engine 108 is an Atkinson-cycle engine comprising six cylinders and having a compression ratio of approximately 12.5:1.

The transmission output shaft 128 is directly coupled to a shaft 136 of a driveline 140 ("driveline shaft 140") of the powertrain 104. In one exemplary implementation, there is no disconnect or decoupling clutch disposed therebetween. Gears 144A and 144B having teeth 148A and 148B are coupled to the transmission output and driveline shafts 128, 132, respectively, and interact to transfer torque therebetween. A control system 152 comprises one or more controllers and is configured to control operation of the powertrain 104. The control system 152 also receives parameters from vehicle sensors and/or input devices, such as, but not limited to, a brake sensor 156 that measures a position of a brake pedal 160 of the vehicle 100, a transmission gear selector 164 (e.g., a bi-directional lever or a rotary knob), a vehicle speed sensor 168, and one or more shaft speed/position sensors 172. The control system 152 is also configured to control a park pawl system 176 and/or an EPB 180 to prevent movement at the driveline 140 (e.g., at a rear set of wheels).

Figure 2:
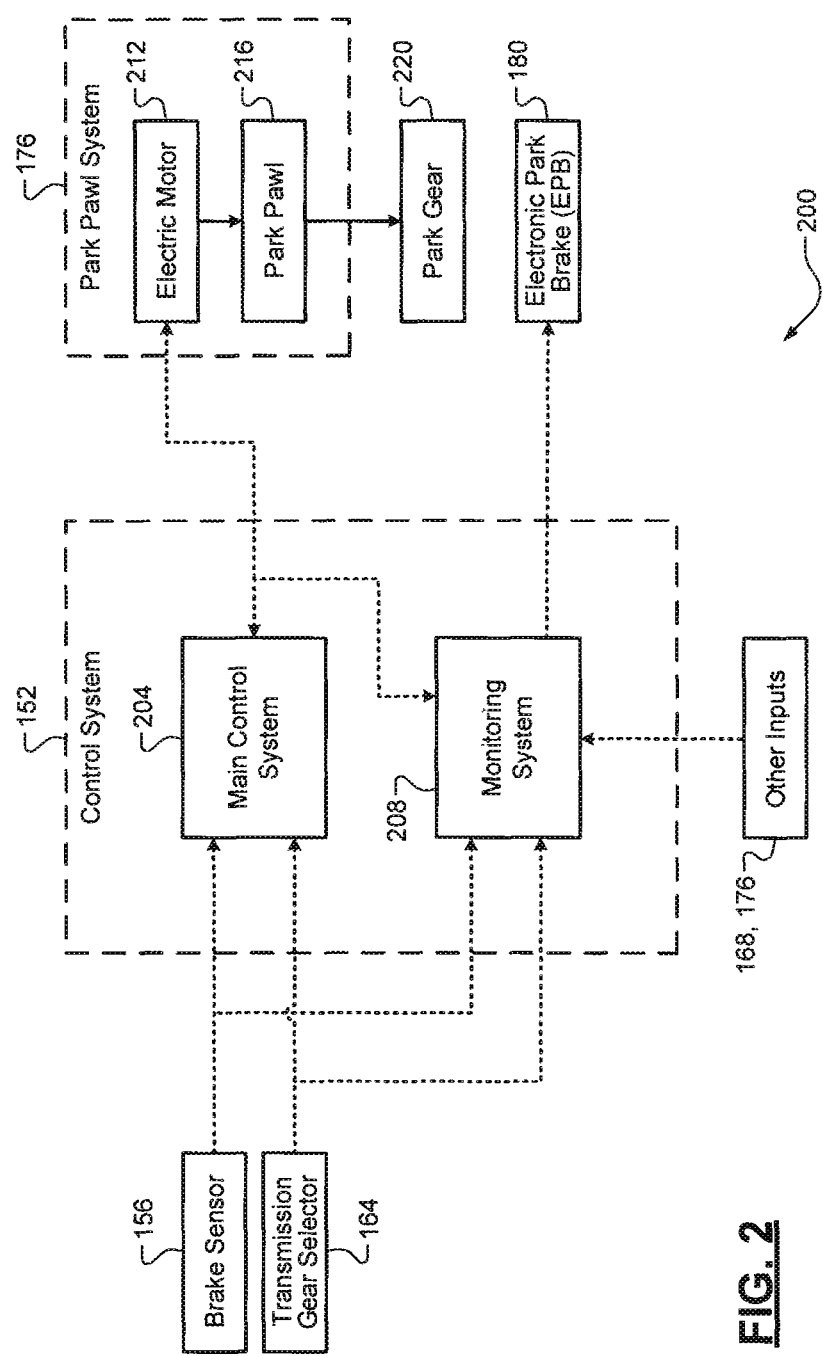
FIG. 2 is a functional block diagram of a control system of the hybrid vehicle according to the principles of the present disclosure.

Referring now to FIG. 2, a functional block diagram of an example configuration 200 of the control system 152 is illustrated. The control system 152 comprises a main control system 204 and a monitoring system 208. The main control system 204 and the monitoring system 208 are also referred to herein as a main control system portion 204 and a monitoring system portion 208 because they could be distinct portions of a same processing device. For example, these systems 204, 208 could be implemented on distinct portions of a single processing unit, such as distinct cores of a multiple core central processing unit. Alternatively, for example, these systems 204, 208 could be implemented on distinct processing units, i.e., two distinct processors. The primary reason that these systems 204, 208 are separated is to provide added redundancy in the event that the main control system 204 fails, such as due to processing or computational error or memory corruption. This is particularly true for the hybrid powertrain configuration illustrated in FIG. 1 and discussed above because the transmission 112 comprises at least one electric propulsion motor.

The main control system 204 receives driver inputs via the brake pedal 160 (as measured by brake sensor 156) and the transmission gear selector 164 (e.g., "PRNDL"). The input from the brake sensor 156 is indicative of a driver brake request and the input from the transmission gear selector 164 is indicative of a transmission gear request. The brake pedal 160 may need to be depressed greater than a threshold, for example, in order to move the transmission 112 in/out of park. This transmission gear request is also referred to in as a desired park state as the transmission gear request could either be park (P) or something other than park (RNDL). Based on the desired park state as determined or detected by the main control system 204, the main control system 204 controls the park pawl system 176. More specifically, when the desired park state is park (P), the main control system 204 commands the park pawl system 176 to engage a park gear 220, and when the desired park state is not park (RNDL), the main control system 204 commands the park pawl system 176 to disengage the park gear 220. The operation of the park pawl system 176 involves the electronic actuation of an electric motor 212 that actuates a park pawl 216 to engage or disengage the park gear 220, which can also involve a sensor (not shown) that measures a position of the electric motor 212.

The output of the main control system (the desired park state) is also fed to the monitoring system 208. The monitoring system 208 receives the same inputs as the main control system 204 (brake sensor 156, transmission gear selector 164, etc.) and performs another processing or computation to determine or detect a desired park state. The monitoring system 208 then compares its desired park state to the desired park state output by the main control system 204. This is also referred to herein as verification of the desired park state determined or detected by the main control system 204. When the values match, the desired park state output by the main control system 204 is verified. When the values do not match, however, the hybrid powertrain 104 is unable to achieve the desired park state and thus a malfunction is detected by the monitoring system 208. When such a malfunction is detected, the monitoring system 208 takes remedial action by actuating the EPB 180 to prevent motion at the driveline 140 of the vehicle 100. This could also include preventing the commanding of the park pawl system 176 by the main control system 204.

It will also be appreciated that the malfunction could be detected in other scenarios, such as when the electric motor 212 does not move to the desired position as commanded by the main control system 204 (thus not fully engaging the park pawl 216) or when the park pawl 216 disengages when not commanded to do so by the main control system 204 via the electric motor 212. This could be monitored based on measured positions of the components of the park pawl system 176 and could also be described as a malfunction of the park pawl system 176. For example, a position sensor (not shown) could measure a position of electric motor 212, which could be provided as input to both the main control system 204 and the monitoring system 208. It will be appreciated that further remedial action could also be necessary. For example, the EPB 180 could be actuated by the vehicle 100 could still be moving (e.g., as indicated by vehicle speed sensor 168). In this event, the monitoring system 208 could take further remedial action by disabling the hybrid powertrain 104. This could include, for example, setting all system torque requests to zero. This could also include setting a diagnostic trouble code (DTC) to prevent any future vehicle operation until cleared (e.g., by a service technician after the vehicle 100 has been serviced).

Figure 3:
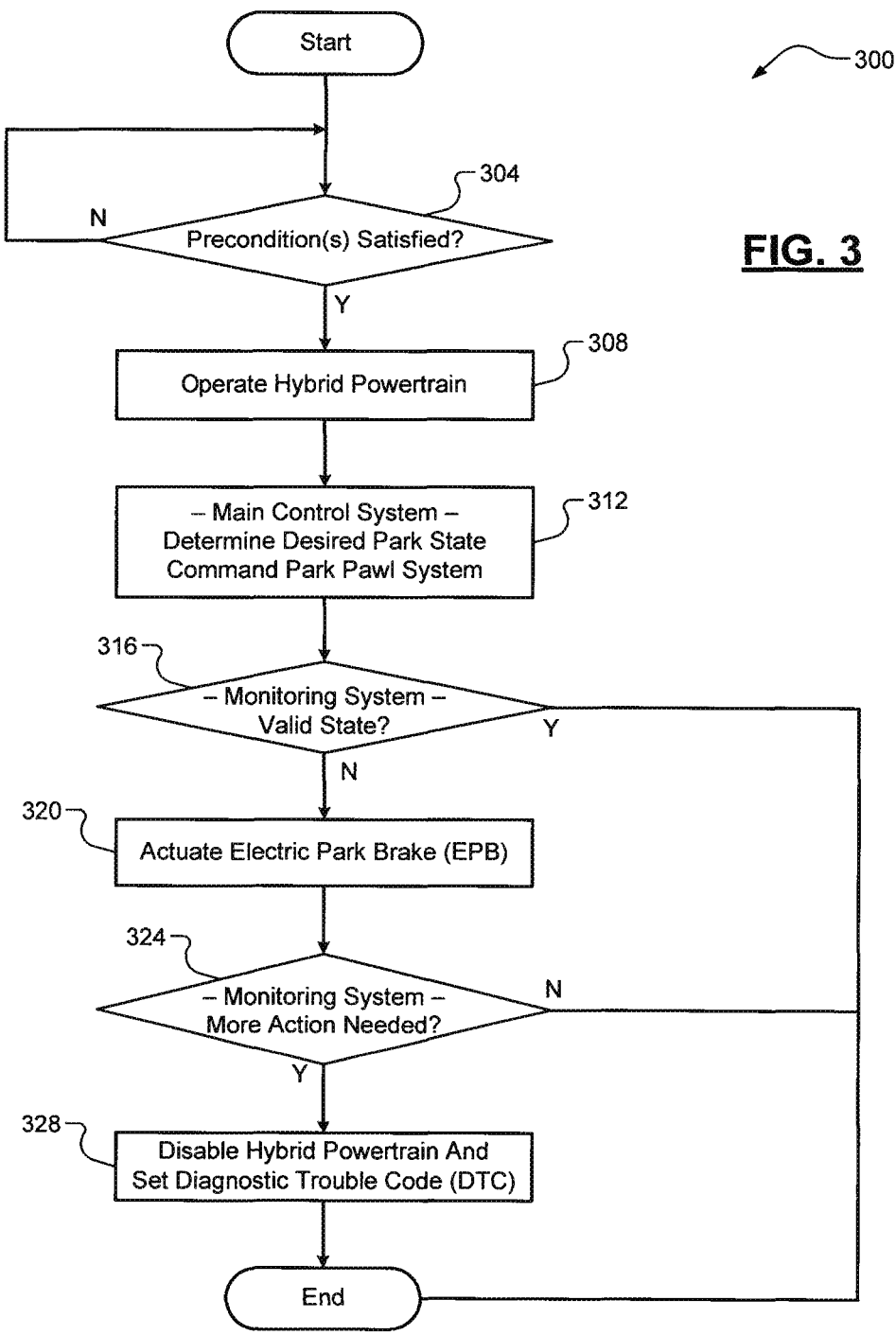
FIG. 3 is a flow diagram of an example method of monitoring vehicle park pawl control and taking remedial action when needed according to the principles of the present disclosure.

Referring now to FIG. 3, a flow diagram of an example method 300 of monitoring vehicle park pawl control and taking remedial action when needed is illustrated. At 304, the control system 152 optionally determines whether one or more preconditions are satisfied. This could include, for example, determining whether there are any existing malfunctions that would preclude vehicle operation, such as the DTC described above having previously been set. When the one or more optional preconditions are satisfied, the method 300 proceeds to 308 where the control system 152 operates the hybrid powertrain 104. This could include, for example, a start-up procedure of the vehicle 100, such as starting the engine 108. At 312, the main control system portion 204 of the control system 152 determines the desired park state based on at least one of the transmission gear and brake pedal inputs and commands the park pawl system 176 to the desired park state. At 316, the monitoring system portion 208 of the control system 152 validates the desired park state based on at least one of the transmission gear and brake pedal inputs. When validated, the method 300 ends or returns to 304.

When invalid, however, the method 300 proceeds to 320 where the monitoring system portion 208 of the control system 152 actuates the EPB 180 to prevent movement at the driveline 140 of the vehicle 100. At 324, the monitoring system portion 208 of the control system 152 determines whether further remedial action is necessary. For example, the vehicle 100 may still be moving after attempting to actuate the EPB 180 as indicated by the vehicle speed sensor 168 or there could be a malfunction of the park pawl system 176. When no additional remedial action is required, the method 300 ends or returns to 304. When further remedial action is needed, however, the method 300 proceeds to 328 where the monitoring system portion 208 of the control system 152 disables the hybrid powertrain 104 (e.g., sets all torque requests to zero) and sets the DTC. The method 300 then ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for a hybrid vehicle, the system comprising:
   a park pawl system comprising an electric motor and a park pawl, wherein the electric motor is configured to actuate the park pawl to engage and disengage a park gear of the vehicle to prevent movement at a driveline of the vehicle; and
   a control system configured to:

control a hybrid powertrain of the vehicle, the powertrain comprising an engine and a hybrid transmission comprising at least one electric propulsion motor;

detect, using a main control system portion of the control system, a desired park state based on at least an input via a transmission gear selector and an input via a brake pedal;

detect, using a monitoring system portion of the control system that is distinct from the main control system portion, whether the desired park state is valid based on at least the transmission gear selector and brake pedal inputs;

when the desired park state is valid, command the park pawl system to the desired park state; and when the desired park state is invalid, command an electric park brake (EPB) of the vehicle to prevent movement at the driveline of the vehicle, wherein when vehicle movement occurs after the electric motor of the park pawl system is in a park position, the control system is further configured to disable the hybrid powertrain.

2. The system of claim 1, wherein the control system is configured to disable the hybrid powertrain by setting all torque requests to zero.

3. The system of claim 1, wherein when vehicle movement occurs after the electric motor of the park pawl system is in the park position, the control system is further configured to set a diagnostic trouble code (DTC).

4. The system of claim 1, wherein the main control system and monitoring system portions of the control system are distinct portions of a single processor.

5. The system of claim 4, wherein the main control system and monitoring system portions of the control system are separate cores of the single processor.

6. The system of claim 1, wherein the main control system and monitoring system portions of the control system are two distinct processors.

7. The system of claim 1, wherein the main control system and monitoring system portions of the control system are configured to detect the desired park state and whether it is valid based further on a speed of the vehicle and a position of the electric motor of the park pawl system.

8. The system of claim 1, wherein the transmission comprises two electric propulsion motors.

9. A hybrid vehicle, comprising:

a hybrid powertrain comprising an engine, a hybrid transmission comprising at least one electric propulsion motor, and a driveline, wherein the engine and the hybrid transmission collectively or independently provide a drive torque to the driveline;

a park pawl system comprising an electric motor and a park pawl, wherein the electric motor is configured to actuate the park pawl to engage and disengage a park gear of the vehicle to prevent movement at the driveline; and a control system configured to:

control the hybrid powertrain;

detect, using a main control system portion of the control system, a desired park state based on at least an input via a transmission gear selector and an input via a brake pedal;

detect, using a monitoring system portion of the control system that is distinct from the main control system portion, whether the desired park state is valid based on at least the transmission gear selector and brake pedal inputs;

when the desired park state is valid, command the park pawl system to the desired park state; and when the desired park state is invalid, command an electric park brake (EPB) of the vehicle to prevent movement at the driveline of the vehicle, wherein when vehicle movement occurs after the electric motor of the park pawl system is in a park position, the control system is further configured to disable the hybrid powertrain.

10. The vehicle of claim 9, wherein the control system is configured to disable the hybrid powertrain by setting all torque requests to zero.

11. The vehicle of claim 9, wherein when vehicle movement occurs after the electric motor of the park pawl system is in the park position, the control system is further configured to set a diagnostic trouble code (DTC).

12. The vehicle of claim 9, wherein the main control system and monitoring system portions of the control system are distinct portions of a single processor.

13. The vehicle of claim 12, wherein the main control system and monitoring system portions of the control system are separate cores of the single processor.

14. The vehicle of claim 9, wherein the main control system and monitoring system portions of the control system are two distinct processors.

15. The vehicle of claim 9, wherein the main control system and monitoring system portions of the control system are configured to detect the desired park state and whether it is valid based further on a speed of the vehicle and a position of the electric motor of the park pawl system.

16. The vehicle of claim 9, wherein the transmission comprises two electric propulsion motors.

* * * * *